UNITED STATES PATENT OFFICE.

FR. M. RUSCHHAUPT, OF PHILADELPHIA, PENNSYLVANIA, ASSIGNOR TO ANTHONY L. FLEURY AND JOHN G. KERSHAW, OF SAME PLACE.

IMPROVEMENT IN PUDDLING-FURNACES.

Specification forming part of Letters Patent No. 42,446, dated April 19, 1864; antedated April 6, 1864.

*To all whom it may concern:*

Be it known that I, FREDERICK M. RUSCHHAUPT, of Philadelphia, Pennsylvania, have invented the Application of Cinder to the Protection of Puddling and other Furnaces; and I do hereby declare the following to be a full, clear, and exact description of the same.

My invention consists in lining puddling and other furnaces with blocks or bricks made of the pulverized cinder or waste of puddling-furnaces, solidified by mixing it with lime and clay, the composition forming an economical substitute for the magnetic iron ore heretofore used for the purpose. The use made of the magnetic iron ore in puddling and other furnaces is too well known to need particular description. It is also well known that after four or five heats such a change takes place in the character of the ore that it no longer affords the protection desired as a refractory substance, but in the form of scoria, or what is generally known as "cinder," rises to the surface of the molten metal in the furnace, and flows from thence with the iron, and is cast aside as perfectly useless material. Chemical analysis has demonstrated that this cinder or waste contains from sixty to eighty per cent. of iron; and the object of my invention is to render it available, as a protection for puddling and other furnaces, in place of magnetic iron ore. To accomplish this result, I take the cinder, and, after pulverizing it to a sufficient extent, I mix with it about one-fifth its quantity, by weight, of lime and one-fifteenth of clay, with sufficient water to saturate the whole and reduce it to such a plastic state that it may be formed into blocks or bricks, which, after being dried, are placed around the sides of the furnace in the same manner as the magnetic ore is arranged and for the same purpose.

The furnace is then heated, and the operation carried on as usual, until the heat of the molten pig-iron becomes so great that the sulphur, which is sometimes contained in considerable quantity in the cinder, begins to be given off. In order to prevent the quality of the iron from being deteriorated by combination with the sulphur, I now introduce into the furnace a previously-determined quantity of hypochloride of lime, the oxygen and chlorine in which separately combine with the sulphur and form sulphurous acid and chloride of sulphur, both of which pass off with the products of combustion.

Blocks thus prepared may be employed for two or three heats, answering equally as well as the magnetic ore, and after this can be again pulverized, mixed with a sufficient quantity of clay and lime, and used as before.

It will of course be apparent that other oxidizing agents may be used instead of the hypochloride of lime, and also that the quantities of lime and clay above given may be varied without departing from the principle of my invention.

I claim as my invention and desire to secure by Letters Patent—

The application of the cinder or waste of puddling and other furnaces, pulverized and solidified with clay and lime, to the protection of puddling and other furnaces, substantially as and for the purpose described.

In testimony whereof I have signed my name to this specification in the presence of two subscribing witnesses.

FR. M. RUSCHHAUPT.

Witnesses:
    CHARLES E. FOSTER,
    JOHN WHITE.